(12) United States Patent
Bitterli et al.

(10) Patent No.: US 10,096,088 B2
(45) Date of Patent: Oct. 9, 2018

(54) ROBUST REGRESSION METHOD FOR IMAGE-SPACE DENOISING

(71) Applicant: DISNEY ENTERPRISES, INC., Burbank, CA (US)

(72) Inventors: Benedikt Martin Bitterli, West Lebanon, NH (US); Jan Novák, Meilen (CH); Fabrice Pierre Armand Rousselle, Ostermundigen (CH)

(73) Assignee: Disney Enterprises, Inc., Burbank, CA (US)

( * ) Notice: Subject to any disclaimer, the term of this patent is extended or adjusted under 35 U.S.C. 154(b) by 25 days.

(21) Appl. No.: 15/279,234

(22) Filed: Sep. 28, 2016

(65) Prior Publication Data

US 2018/0089806 A1 Mar. 29, 2018

(51) Int. Cl.
*G06T 5/00* (2006.01)

(52) U.S. Cl.
CPC .... *G06T 5/002* (2013.01); *G06T 2207/10024* (2013.01); *G06T 2207/20024* (2013.01)

(58) Field of Classification Search
CPC .................................................. G06T 5/002
See application file for complete search history.

(56) References Cited

U.S. PATENT DOCUMENTS

2016/0098820 A1* 4/2016 Rousselle ............... G06T 5/002
    345/426
2016/0321523 A1* 11/2016 Sen .......................... G06T 5/002

OTHER PUBLICATIONS

Buades A., Coll B., Morel J.-M.: A review of image denoising algorithms, with a new one. Multiscale Modeling & Simulation 4, 2 (2005), 490-530. 2, 3, 8.

Buades A., Coll B., Morel J.-M.: Nonlocal image and movie denoising. International Journal of Computer Vision 76, 2 (2007), 123-139. 8.

Bauszat P., Eisemann M., Eisemann E., Magnor M.: General and robust error estimation and reconstruction for Monte Carlo rendering. Computer Graphics Forum 34, 2 (2015), 597-608. 4, 5.

Bitterlie B., Rousselle F., Novak J.: A Combined Regression Method for Image-Space Denoising, Eurographics Symposium on Rendering 2015, vol. 34, No. 4.

(Continued)

*Primary Examiner* — Sean Motsinger
(74) *Attorney, Agent, or Firm* — Patterson + Sheridan, LLP

(57) ABSTRACT

The disclosure provides an approach for denoising (also referred to as "filtering") rendered images. In one embodiment, a denoising application takes as input rendered images and feature buffers that encode image information such as surface positions, surface depths, surface normals, surface albedos, and distances to the camera. For each pixel in a received image, the denoising application performs a first-order regression in a predefined neighborhood of the pixel to find a linear combination of pixel features that fits pixel colors in the predefined neighborhood. In such a first-order regression, the local regression weight of each pixel in the neighborhood may be determined using a metric which computes distances based on color values in patches around pixels being compared. In another embodiment, collaborative filtering may be performed in which filtered output from the first-order regression in each neighborhood is averaged with filtered output from overlapping neighborhoods to obtain a final output.

20 Claims, 6 Drawing Sheets

(56) References Cited

OTHER PUBLICATIONS

Bitterlie B., Rousselle F., Bochang M. Iglesian-Guitian J.A., Adler, D., Mitchell, K., Wojciech, J., Novak J.: Nonlinearly Weighted First-order Regression for Denoising Monte Carlo Renderings, Eurographics Symposium on Rendering 2016, vol. 35, No. 4.

Delbracio M., Musé P., Buades A., Chauvier J., Phelps N., Morel J.-M.: Boosting Monte Carlo rendering by ray histogram fusion. ACM Trans. Graph. 33, 1 (Feb. 2014), 8:1-8:15.2, 3, 8, 9.

Donoho D. L.: De-noising by soft-thresholding. Information Theory, IEEE Transactions on 41, 3 (1995), 613-627. 2.

Dammertz H., Sewtz D., Hanika J., Lensch H. P. A.: Edge-avoiding à-trous wavelet transform for fast global illumination filtering. In Proc. Conf. on High Performance Graphics (2010), HPG '10, Eurographics Association, pp. 67-75. 2.

Eisemann E., Durand F.: Flash photography enhancement via intrinsic relighting. ACM Trans. Graph. (Proc. SIGGRAPH) 23, 3 (Aug. 2004), 673-678. 2.

Elad M.: On the origin of the bilateral filter and ways to improve it. IEEE Transactions on Image Processing 11, 10 (Oct. 2002), 1141-1151. 2.

He K., Sun J., Tang X.: Guided image filtering. In Proc. 11th European Conf. on Computer Vision: Part I (Berlin, Heidelberg, 2010), ECCV'10, Springer-Verlag, pp. 1-14. 2.

Keller A., Fascione L., Fajardo M., Georgiev I., Christensen P., Hanika J., Eisenacher C., Nichols G.: The path tracing revolution in the movie industry. In ACM SIGGRAPH 2015 Courses (2015), ACM, pp. 24:1-24:7. 1.

Kalantari N. K., Sen P.: Removing the noise in monte carlo rendering with general image denoising algorithms. Comp. Graph. Forum (Proc. Eurographics) 32, 2pt1 (2013), 93-102. 2.

Li T.-M., Wu Y.-T., Chuang Y.-Y.: Sure-based optimization for adaptive sampling and reconstruction. ACM Trans. Graph. (Proc. SIGGRAPH Asia) 31, 6 (Nov. 2012), 194:1-194:9. 2, 4.

McCool M. D.: Anisotropic diffusion for Monte Carlo noise reduction. ACM Trans. Graph. 18, 2 (Apr. 1999), 171-194. 2.

Moon B., Iglesias-Guitian J. A., Yoon S.-E., Mitchell K.: Adaptive rendering with linear predictions. ACM Trans. Graph. (Proc. SIGGRAPH) 34, 4 (Jul. 2015), 121:1-121:11.2, 5, 7.

Moon B., Jun J. Y., Lee J., Kim K., Hachisuka T., Yoon S.-E.: Robust image denoising using a virtual flash image for Monte Carlo ray tracing. Comp. Graph. Forum 32, 1 (2013), 139-151. 2.

Moon B., McDonagh S., Mitchell K., Gross M.: Adaptive polynomial rendering. To appear in ACM Trans. Graph. (Proc. SIGGRAPH) (2016). 2.

Overbeck R. S., Donner C., Ramamoorthi R.: Adaptive wavelet rendering. ACM Trans. Graph. (Proc. SIGGRAPH Asia) 28, 5 (2009), 140-1. 2.

Paris S., Kornprobst P., Tumblin J., Durand F.: Bilateral filtering: Theory and applications. Foundations and Trends in Computer Graphics and Vision 4, 1 (2008), 1-73. 2.

Petschnigg G., Szeliski R., Agrawala M., Cohen M., Hoppe H., Toyama K.: Digital photography with flash and no-flash image pairs. ACM Trans. Graph. (Proc. SIGGRAPH) 23, 3 (Aug. 2004), 664-672. 2.

Rousselle F., Knaus C., Zwicker M.: Adaptive sampling and reconstruction using greedy error minimization. ACM Trans. Graph. (Proc. SIGGRAPH Asia) 30, 6 (Dec. 2011), 159:1-159:12.2, 4.

Rousselle F., Knaus C., Zwicker M.: Adaptive rendering with non-local means filtering. ACM Trans. Graph. (Proc. SIGGRAPH Asia) 31, 6 (Nov. 2012), 195:1-195:11.2, 3, 4, 6, 8.

Rousselle F., Manzi M., Zwicker M.: Robust denoising using feature and color information. Comp. Graph. Forum (Proc. of Pacific Graphics) 32, 7 (2013), 121-130. 2, 3, 4, 6, 7, 8.

Sen P., Darabi S.: On filtering the noise from the random parameters in Monte Carlo rendering. ACM Trans. Graph. 31, 3 (Jun. 2012), 18:1-18:15.2, 4.

Stein C. M.: Estimation of the mean of a multivariate normal distribution. The annals of Statistics (1981), 1135-1151. 2, 5, 7.

Takeda H., Farsiu S., Milanfar P.: Kernel regression for image processing and reconstruction. IEEE Transactions on Image Processing 16, 2 (Feb. 2007), 349-366. 3.

Tomasi C., Manduchi R.: Bilateral filtering for gray and color images. In Computer Vision, 1998. Sixth International Conf. on (1998), pp. 839-846. 2.

Van De Ville D., Kocher M.: Sure-based non-local means. IEEE Signal Process. Lett. 16, 11 (2009), 973-976. 2.

Zwicker M., Jarosz W., Lehtinen J., Moon B., Ramamoorthi R., Rousselle F., Sen P., Soler C., Yoon S.-E.: Recent advances in adaptive sampling and reconstruction for Monte Carlo rendering. Comp. Graph. Forum (Proc. Eurographics) 34, 2 (May 2015), 667-681. 1, 2.

Kalantari N. K., Bako S., Sen P.: A machine learning approach for filtering Monte Carlo noise. ACM Trans. Graph. (Proc. SIGGRAPH) 34, 4 (Jul. 2015), 122:1-122:12.2, 3, 4, 8.

Manzi M., Vicini D., Zwicker M.: Regularizing Image Reconstruction for Gradient-Domain Rendering with Feature Patches. To appear in Comp. Graph. Forum (Proc. Eurographics) (2016).

* cited by examiner

ROBUST REGRESSION METHOD FOR IMAGE-SPACE DENOISING

BACKGROUND

Field

Embodiments presented herein relate to the field of computer image rendering and, in particular, to a robust regression technique for denoising rendered images.

Description of the Related Art

In Monte Carlo (MC) rendering, pixels are sampled by shooting view rays through the pixels into a virtual scene, with the output color of each pixel being determined based on interactions of associated view rays with objects (or lack of such interactions) in the scene. MC rendering techniques have proven to be effective at rendering realistic images of virtual scenes. However, images rendering using MC rendering techniques are inherently noisy. Such noise can be reduced by running the renderer longer, but the level of noise decreases only with the square root of samples used in the rendering. As a result, the computational cost of generating perceptually noise-free images can be prohibitively high for many applications such as movie production.

SUMMARY

One embodiment provides a computer-implemented method for denoising a rendered image. The method generally includes receiving the rendered image and a set of features associated with the image. The method further includes, for each of a plurality of pixels in the image, performing a regression in a predefined neighborhood of the pixel to find a combination of pixel features that fits pixel colors in the predefined neighborhood. In the regression, a local regression weight of each of the pixels in the predefined neighborhood is determined based on a distance metric which computes distances based on color values in patches around pixels being compared. In addition, the method includes determining output color values for each of the plurality of pixels in the image based on the regressions.

Other embodiments include a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Figure 1:
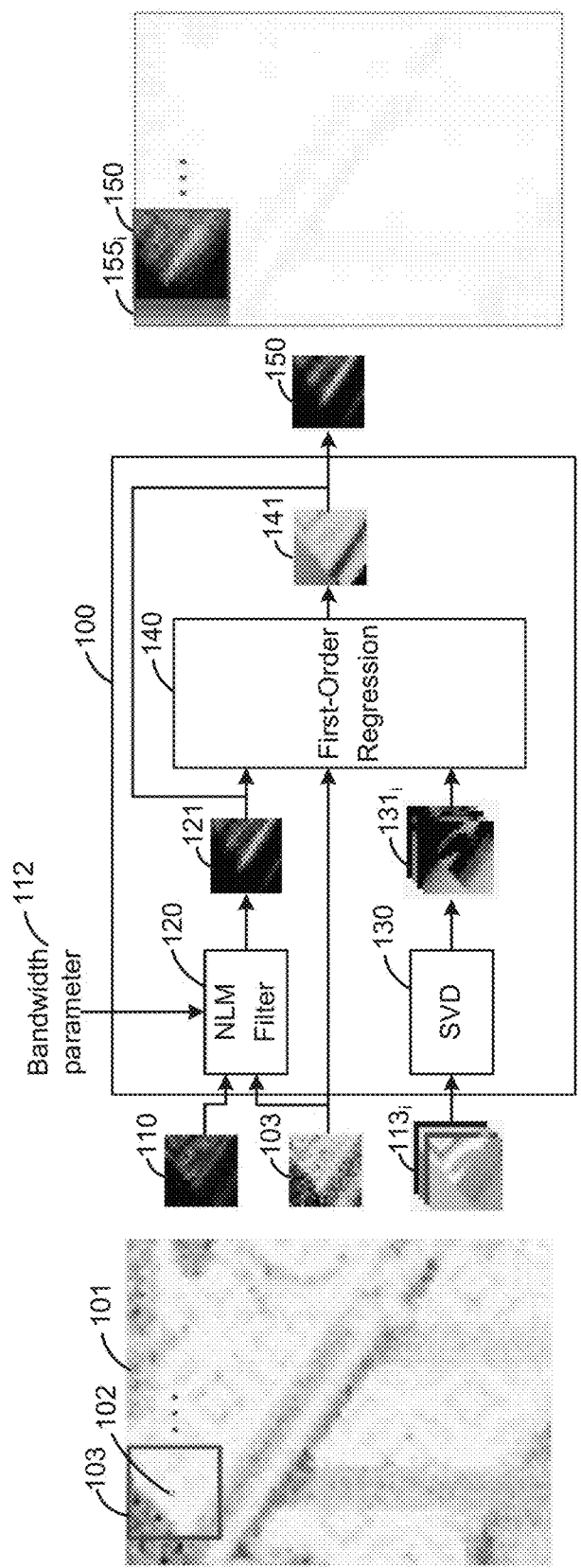
FIG. 1 illustrates an approach for denoising rendered images, according to an embodiment.

Embodiments disclosed herein provide techniques for denoising (also referred to herein as "filtering") images rendered via Monte Carlo (MC) rendering techniques. In one embodiment, a denoising application takes as input such rendered images and auxiliary feature buffers that encode additional image information such as surface positions, surface depths, surface normals, surface albedos, or distances to the camera. For each pixel in a received image, the denoising application performs a first-order regression in a predefined neighborhood of the pixel to find a linear combination of pixel features that fits pixel colors in the predefined neighborhood. In such a first-order regression, the local regression weight of each pixel in the neighborhood is determined using a metric which computes distances based on color values in patches around pixels being compared. Doing so restricts the regression to a local neighborhood in which pixel color is relatively similar and the linear model is expected to behave consistently, thereby preventing over-blurring edges that are not encoded in the feature buffers. That is, the first-order regression leverages the correlation between the pixel features and the ground truth images, while the patch-based weighting kernel in the regression helps preserve fine details even when the features do not provide enough correlation.

In another embodiment, collaborative filtering may be performed in which filtered output from the first-order regression in each neighborhood is averaged with filtered output from overlapping neighborhoods; specifically, the average may be a weighted average of filtered windows each weighted by its regression kernel. In yet another embodiment, the input feature buffers may be filtered in a prefiltering step prior to the collaborative first-order regression to remove noise from the features. In a further embodiment, the first-order regression is performed multiple times using different bandwidth parameters controlling the number of pixels considered in the regression, with the output color values being a weighted average of color buffers obtained from the multiple first-order regressions and the weights in such a weighted average being determined based on squared differences between a filtered color half buffer and a noisy color half buffer.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications for denoising rendered images or related data available in the cloud. For example, the denoising application could execute on a computing system in the cloud, take as input images rendered via MC rendering, denoise such images according to techniques disclosed herein, and send back the denoised images to users' devices. Doing so allows a user to access this information from any computing system attached to a network connected to the cloud (e.g., the Internet).

Referring now to FIG. 1, an approach for denoising rendered images according to an embodiment is shown. As shown, a denoising application takes as input an image 101 rendered via MC rendering, in which pixels are sampled by shooting view rays through the pixels into a virtual scene, with the output color of each pixel being determined based on interactions of associated view rays with objects in the scene. The denoising application is configured to remove noise from the image 101 by taking a weighted average of the neighborhood of each pixel (e.g., the window 103 surrounding pixel 102) to determine an output color value for the pixel. Mathematically, image-space denoising estimates the value of pixel p as the weighted average:

$$\hat{c}_p = \frac{1}{c_p} \sum_{q \in N_p} c_q w(p, q), \quad (1)$$

where $c_p$ and $\hat{c}_p$ are the (noisy) input and filtered color values of pixel p, $\mathcal{N}_p$ is the (typically square) neighborhood centered on p, w(p,q) is the weight of the contribution of pixel q to the estimate, and $C_p = \Sigma_{q \in \mathcal{N}_p} w(p,q)$ is a normalization factor.

Illustratively, a denoising application determines the pixel weights w(p,q) in equation (1) using a first-order regression 140 in which the regression kernel (also referred to herein as the "local regression weights") is computed using a patch-wise metric in which distances are obtained based on color values in patches around the pixels being compared. For example, the patch-wise metric may involve taking two 9×9 patches centered on the pixels being compared and computing the average difference between corresponding pixel colors in those patches. Such a patch-wise metric provides a measure of similarity between pixels in the window 103 so that the pixels that are "far" from a given pixel are given less weight in the linear regression for that pixel. For example, a table and a wall may both appear in the window 103, but pixels depicting the table may be "far" from pixels depicting the wall based on the patch-wise metric and thus given less weight. It should be understood that simply using the difference in color as the metric (rather than the patch-wise metric) may not work, as rendered images tend to be noisy with randomly fluctuating colors. On the other hand, higher dimensional metrics such as metrics that take into account surface orientation and other features are difficult to tune and may be detrimental to first-order models as, e.g., it may be unclear how much a difference in surface orientation should be permitted. In one embodiment, weights of the non-local means (NLM) filter may be used as the regression kernel. The NLM filter is a filter that uses weights computed from a patch-wise metric and, in particular, the distance metric in the NLM filter is the relative square distance between corresponding pixel pairs, averaged over two patches.

As shown, the denoising application takes as input the rendered image 101 which is noisy, and, for each pixel in the rendered image, uses a neighborhood 103 of the image 101 surrounding the pixel and an associated variance 110, as well as an input bandwidth parameter 112, to determine local regression weights (i.e., the regression kernel) 121 for the pixels in the neighborhood 103. The size of the neighborhood 103 may be any feasible value (e.g., 24×24 pixels or 60×60 pixels), such as a user-defined value. The denoising application applies the patch-wise metric which computes distances based on color values in patches around pixels being compared (shown as the distance metric used to compute weights in NLM filter 120) to obtain the local regression weights 121. In addition, the denoising application uses singular value decomposition (SVD) 130 to obtain orthogonal features from the input feature buffers. The denoising application then performs a first-order regression 140 to find a linear combination of the features 113 that fits pixel colors in the neighborhood 103, with the local regression weights 121 being used in the first order regression 140. It should be understood that the input feature buffers may encode redundant information. For example, if an image has a grayscale color, the R, G, B channels of the albedo buffer will all encode the same information. The SVD decomposition takes this set of (potentially correlated) input features, and converts it to a set of orthogonal ("independent") features 113 for analysis. The SVD decomposition is also used to identify "unreliable" features with very small singular values that may lead to unstable fits and resulting coefficients that are not reliable. The regression fit result, however, is coefficients for standard features.

The first-order regression 140 models the pixel neighborhood 103 as a linear function and solves for both the center pixel's 102 value and its first partial derivatives, rather than modeling the neighborhood as a constant function as in traditional zero-order regression. The additional degree of freedom in first-order regression 140 permits many auxiliary feature buffers to be linearly combined, allowing for a richer model of the pixel neighborhood than the single constant in traditional zero-order regression. While patch-wise distance metrics, such as that used to compute weights in the NLM filter 120, are a poor choice for zero-order regression, embodiments described herein use a patch-wise distance metric based on color to determine weights in the first-order regression 140, which has produced surprisingly high quality results. In particular, use of the patch-wise metric effectively restricts the regression to a local neighborhood in which the linear model may be expected to behave consistently, and the kernel bandwidth also controls the effective size of the regression window, as discussed in greater detail below.

The linear function being solved for in the first-order regression 140 is a linear combination of the features 113 that fits pixel colors in the neighborhood 103. That is, the first order regression attempts to explain colors in the neighborhood 103 as a weighted combination of the features by fitting the features to the noisy input using a line and minimizing an error metric. The features themselves are typically collected by a renderer and used to synthesizes pixel colors in a MC rendering (e.g., the orientation that a surface is facing may affect rendered color of the surface), and this same feature information may form a "feature basis" vector that the denoising application takes as input. Examples of features include surface positions, surface depths, surface normals (i.e., orientation), surface albedos, distances to a camera, visibility, a constant feature, horizontal and vertical ramp features, and the like.

Mathematically, a regression may be performed to minimize the following error:

$$\text{Error}(\hat{c}_p) = \Sigma_{q \in \mathcal{N}_p} (c_q - \tilde{m}_x(p,q)q)^2 \tilde{w}_y(p,q) \quad (2)$$

where x is a one-dimensional vector typically storing color and other feature values; $\tilde{m}_x$ is the model; and $\tilde{w}_y(p,q)$ are the local regression weights. There are generally three main elements involved in computing regression weights: the kernel function (uniform, Gaussian, Epanechnikov, etc.), the pixel features considered (color, normal, albedo, etc.), and the kernel bandwidth along each dimension of the feature space. As discussed in greater detail below, one embodiment may use regression weights computed with a patch-wise distance metric that considers pixel color (but not other features), and a bandwidth parameter determined based on squared differences between filtered color buffers of a sets of buffers and the received color buffers of the other set of buffers. That is, the vector x for evaluating the model may use features such as albedo, normal, etc., that are different from the vector y for the weights, which instead uses color patches. In such a case, the first-order regression itself leverages the correlation between the pixel features and the ground truth images, while the patch-based weighting kernel in the regression helps preserve fine details even when the features do not provide enough correlation. Essentially, the first-order regression and the weights are complementary in that the color-based regression weights may capture elements not encoded in the feature set (e.g., indirect shadows, caustics, etc.), while the model preserves the high-frequency elements captured by the feature set (e.g., texture details, high-frequency normal map, etc.).

In one embodiment, model $\hat{m}_x$ in equation (2) is the linear first-order model that relates the features, but not the color itself, to pixel color and the local regression weights $\tilde{w}_y(p,q)$ are the patch-wise distance metric weights 121 computed based on pixel color and variance, as discussed above. In such a case, the first-order regression may be written as:

$$[\hat{c}_p, \nabla \hat{c}_p] = \arg\min_{\hat{c}_p, \nabla \hat{c}_p} \sum_{q \in N_p} (c_q - \hat{c}_p - \nabla \hat{c}_p \cdot (x_q - x_p))^2 \tilde{w}_y(p,q), \quad (3)$$

where x is a one-dimensional vector storing the features (e.g., surface positions, surface depths, surface normals, surface albedos, distances to a camera, visibility, a constant feature, and horizontal and vertical ramp features), and $\tilde{w}_y(p,q)$ is the regression weight calculated from y. This first-order regression permits correlations between the features (e.g., normal, albedo, depth, and visibility) and pixel colors to be exploited, while the patch-wise distance metric provides a robust baseline in the absence of such correlations to prevent over-blurring of edges that are not encoded in the features.

To denoise the image 101, the first-order regression 140 may be performed multiple times, namely on neighborhoods surrounding each of the pixels in the image 101. It should be understood that by performing such a first-order regression, the entire filter window (e.g., the window 103) around a pixel is denoised at once, such that each pixel in the image is denoised multiple times, once for each filter window around a pixel it appears in. In one embodiment, the denoising application may compute the final output as a weighted average of denoised filter windows that are overlapping, with each filtered window weighted by its regression kernel. The regression kernel weights are useful in that, when a reconstruction is wrong, it may be removed based on the weight. This process of averaging overlapping filtered windows weighted by their regression kernels is referred to herein as "collaborative" filtering, as the overlapping filtered windows are used collaboratively in filtering. Illustratively, the regression weights (kernel) 121 are applied to the filtered window 141, producing a weighted filtered result 150. The denoising application then averages the weighted filtered result 150 with other weighted filtered results 155; in windows that overlap with the weighted filtered result 150 window.

In addition to the collaborative first-order regression with regression weights computed using the patch-wise distance metric, the denoising application may also employ feature prefiltering and selection-based bandwidth estimation. It should be understood that the input features may be noisy, and the denoising application may perform feature prefiltering to remove the feature noise, as discussed in greater detail below. In such a case, the feature buffers 113 may be prefiltered feature buffers. Further, the denoising application may determine the kernel bandwidth parameter 112, which controls the number of pixels considered in the regression (i.e., controls the effective size of the regression window), based on a mean squared error (MSE) estimated using squared differences between the filtered color buffers (e.g., filtered window 141) and statistically independent noisy color buffers that are taken as input, as discussed in greater detail below.

Figure 2:
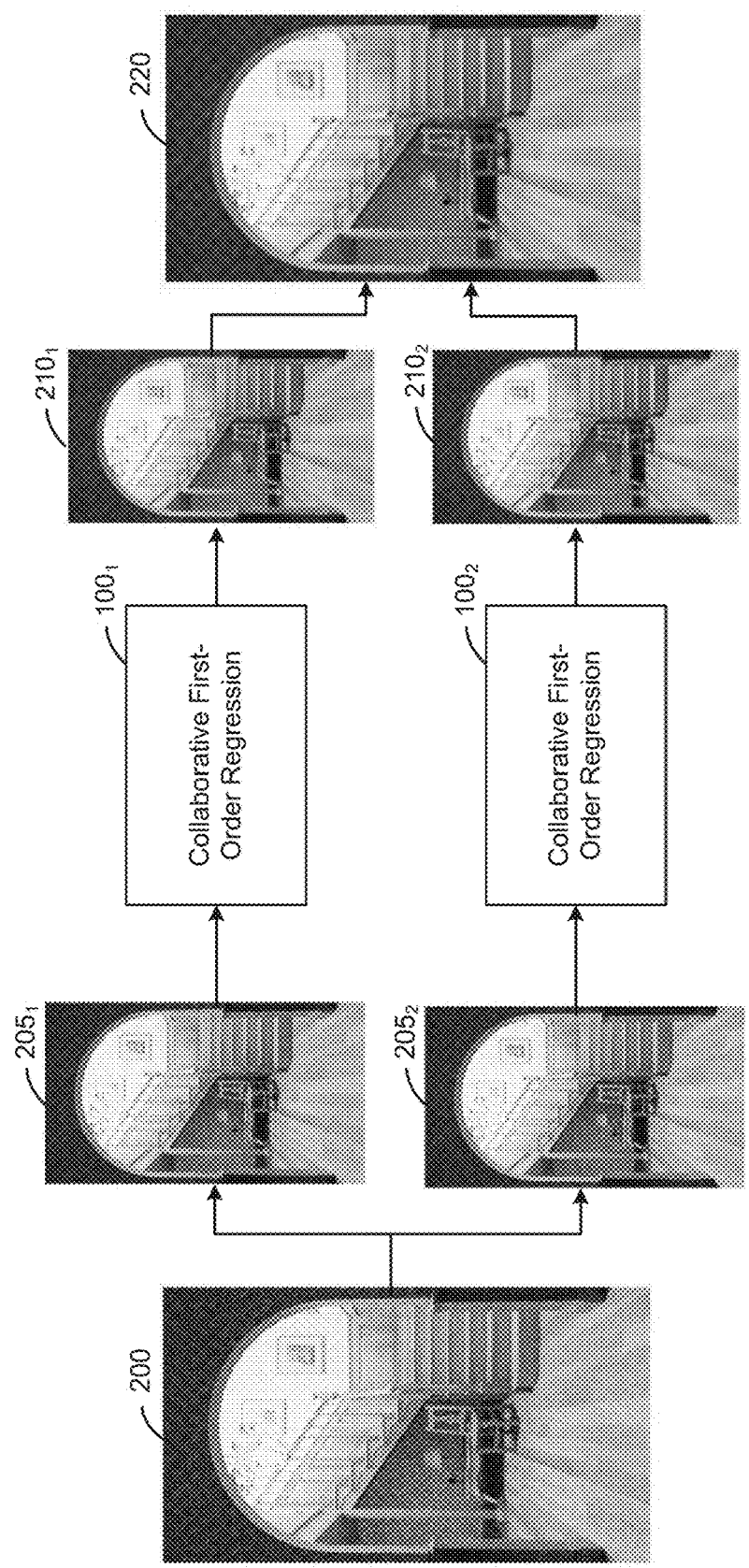
FIG. 2 illustrates the denoising approach of FIG. 1 being applied to two sets of half buffers, and averaging the resulting outputs to obtain a final output, according to an embodiment.

FIG. 2 illustrates the denoising approach of FIG. 1 being applied to two sets of half buffers, and averaging the resulting outputs to obtain a final output, according to an embodiment. As shown, the denoising application receives a rendered image 200 and associated features (not shown). The denoising application then splits the rendered image 200's color buffer and the feature buffers into two statistically independent sets of color and feature buffers. For example, the color of each pixel may be sampled 1000 times, with 500 such samples being placed into each of the two color buffers, shown as color buffers $205_{1-2}$, and similarly for the feature buffers.

Illustratively, the denoising application performs collaborative first-order regressions $100_{1-2}$, similar to the filtering 100 discussed above with respect to claim 1, on each of the sets of color and feature buffers separately. In one embodiment, the denoising application may use the feature buffers of one set of buffers when fitting the color buffer of the other set of buffers in the collaborative first-order regressions $100_{1-2}$, and vice versa, which is also referred to herein as "cross-filtering." The noise in the feature buffers of each set of buffers will generally be correlated with the noise in the color buffer of the same set, so a linear regression using the color buffer and corresponding feature buffers from the same set will tend to reconstruct the low frequency noise of the color buffer in the filtered output. By instead using the feature buffers of one set of buffers when fitting the color buffer of the other set of buffers in the cross-filtering process, the denoising application may decorrelate the noise in the feature buffers from the noise in the color buffer. As further shown, the denoising application combines the images $210_{1-2}$ output by the regressions $100_{1-2}$ into the final output image 220. In one embodiment, the denoising application may average the images $210_{1-2}$ to obtain the final output image 220.

In another embodiment, rather than cross-filtering, the regression may be performed just once using the full data set, based on the features and colors averaged on the two half buffers. The result of such a regression may be converted into effective neighborhood weights (the linear combination of features can be directly interpreted as weighting the pixel neighborhood), which may then be applied to the two half buffers, with the rest of the steps being unchanged. This embodiment is faster (since one regression is performed once instead of twice), and experience has shown that it also tends to give equally good results. That is, the fitting may be performed in several ways: using the buffer's own features, using the features of another buffer, or using the average of two half buffers' features.

Similar to the discussion above with respect to FIG. 1, the denoising application may also prefilter the feature buffers of each set of buffers prior to performing the regressions $100_{1-2}$. In one embodiment, the denoising application may filter all of the feature buffers using an NLM filter. In such a case, the denoising application may use a two-step filtering process to minimize noise resulting from residual filtering artifacts in the feature buffers propagating directly to the filtered output after the first order regressions $100_{1-2}$. In the two-step process, the denoising application first uses the feature buffers from each set of buffers in a cross-filtering (or non-cross-filtering) scheme, with the NLM weights computed from the feature buffers of one set being used to filter the feature buffers of the other set (or the same set or an average of the sets), and vice versa. The cross-filtering scheme decorrelates the noise of the weights from the noise of the data. The denoising application then takes the squared difference of the two filtered feature buffers from the sets of buffers, which gives an estimate of their residual variance, and uses the squared difference in a second filtering pass to further remove residual noise.

Figure 3:
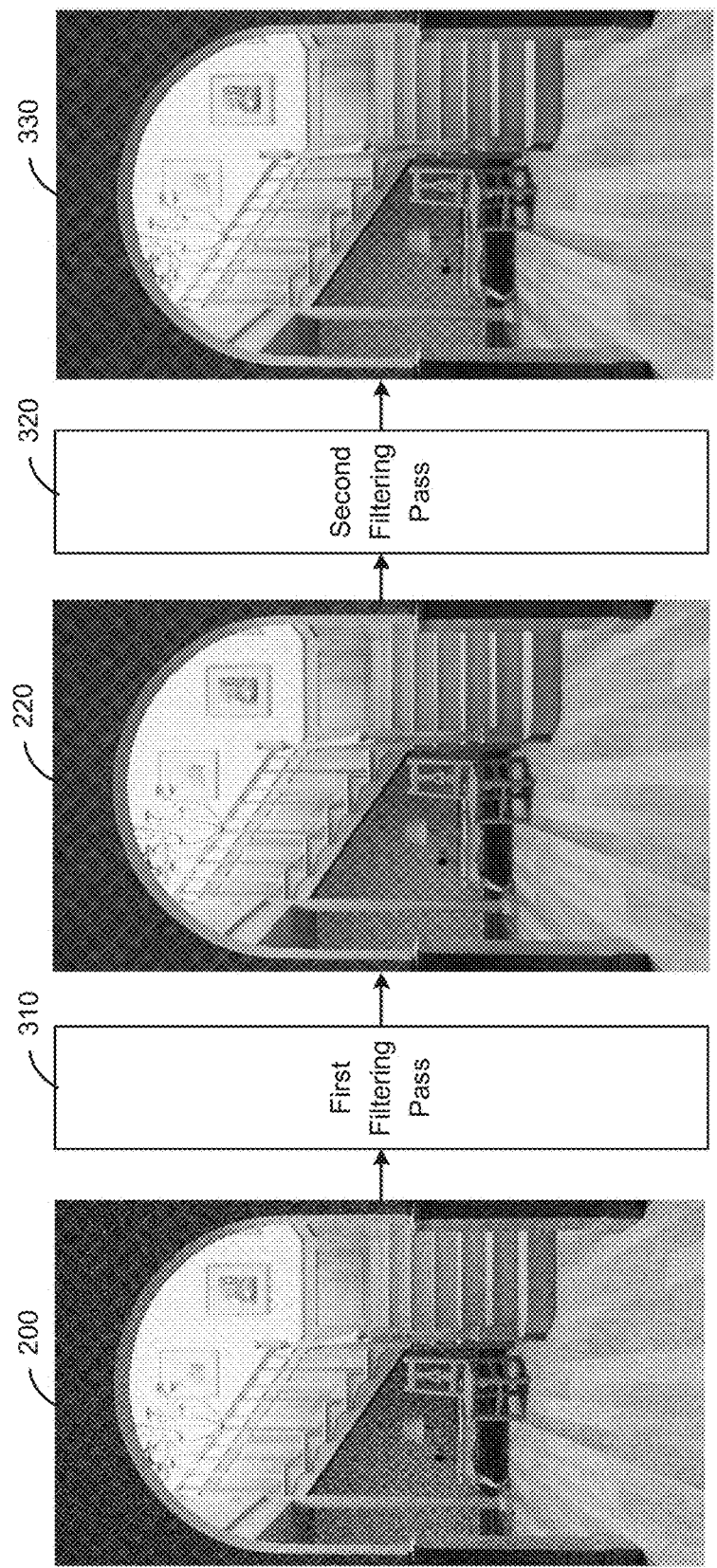
FIG. 3 illustrates performing two filtering passes to denoise a rendered image, according to an embodiment.

FIG. 3 illustrates performing two filtering passes to denoise a rendered image, according to an embodiment. As shown, the denoising application receives the rendered image 200 as input and performs a first filtering pass 310 to obtain an output image 220 that is denoised. In one embodiment, the first filtering pass may include performing feature prefiltering and a collaborative first-order regression in which local regression weights are determined using a metric which computes distances based on color values in patches around pixels being compared, as discussed above with respect to FIGS. 1-2. In particular, the denoising application may split the input image 200 buffer and its associated feature buffer (not shown) into two statistically independent sets of half buffers that are filtered separately, with the feature buffer of one set being used in a first-order regression to fit colors of the other set and vice versa (or to fit colors of the same set, or an average of features and colors of the two sets may be used), and the output of such separate filtering may be combined to obtain the final output colors, as discussed above with respect to FIG. 2.

Subsequent to the first filtering pass 310, the denoising application performs a second filtering pass 320 on the output 220 of the first filtering pass 310 to remove residual noise artifacts. In the second filtering pass 320, the variance of the first pass output is needed to compute regression weights. In one embodiment, the denoising application may compute such variance across filtered half buffers. As discussed with respect to FIG. 2, the outputs of filtered half buffers are averaged to obtain the final output, and, in the second filtering pass 320, the denoising application may directly refilter such an average of the filtered half buffers without performing cross filtering with two sets of color and feature buffers.

Figure 4:
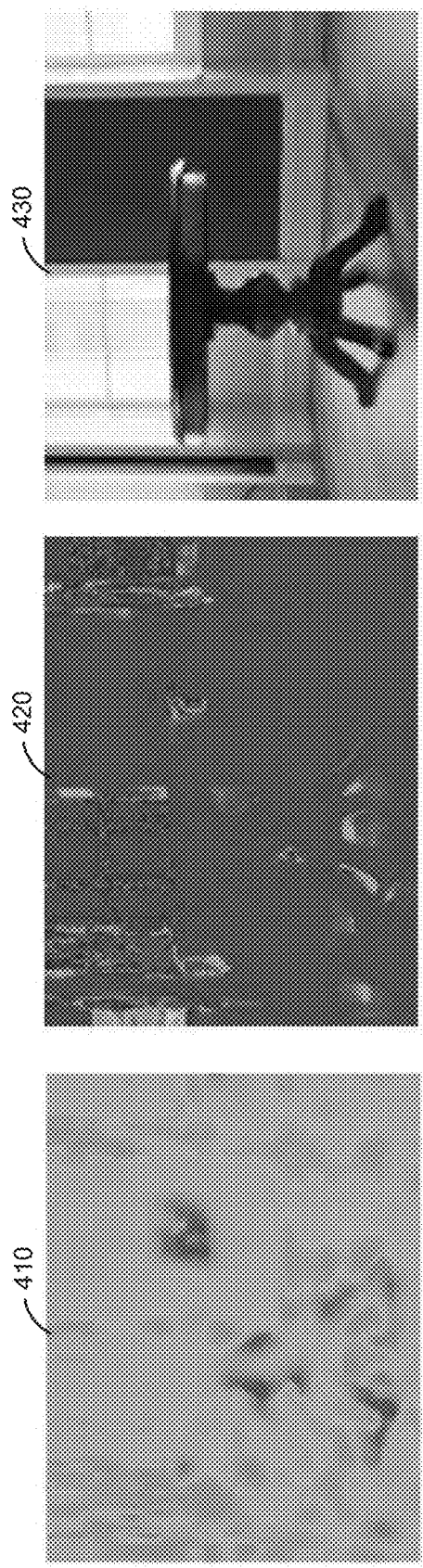
FIG. 4 illustrates a selection map, filtered output, and estimated errors from a selection-based bandwidth estimation, according to an embodiment.

FIG. 4 illustrates selection maps, filtered outputs, and estimated errors from a selection-based bandwidth estimation, according to an embodiment. As discussed, the kernel bandwidth is a parameter that controls the number of pixels considered in the regression. The kernel bandwidth has to balance two conflicting goals: reducing the variance and preventing bias (over-blurring). A larger bandwidth increases the effective size of the neighborhood $\mathcal{N}_p$, which reduces the variance but tends to increase bias. The kernel bandwidth needs to strike a balance between such residual variance and bias, which amounts to minimizing the MSE.

In one embodiment, the denoising application may use a general mean squared error estimator, capable of handling collaborative filtering and nonlinear weights, to select one bandwidth parameter. This differs from traditional approaches, which had multiple bandwidth parameters. Experience has shown that NLM regression weights in particular tend to be robust, and setting the bandwidth parameter of a NLM regression weight to k=0.5 gives reasonable results on a wide range of scenes. In some cases, however, a larger bandwidth may be preferable. In one embodiment, the denoising application may select a bandwidth from the set of parameters k={0.5,1.0}. FIG. 4 shows a selection map 310 resulting from the use of such bandwidth parameters with regions in which k=0.5 is used shown in red and regions in which k=1.0 is used shown in green. The filtered MSE estimates 320 used to generate the selection map 310 and the ultimate output image 330 are also shown.

In one embodiment, the denoising application may apply a general mean squared error estimator which leverages the two half buffers of samples, discussed above, to select the bandwidth parameter to use. In such a case, the denoising application may perform the first-order regression 140 multiple times with different bandwidth parameters (e.g., k=0.5 and k=1.0) for the local regression weights, and the denoising application may then determine output color values in the final filtered window 141 as a weighted average of color buffers obtained from the multiple first-order regressions, with the weights in the weighted average being determined based on squared differences between one filtered color half buffer and the other noisy color half buffer that is received (prior to filtering). It should be understood that statistically independent buffers are needed for the MSE computation to be valid. Consider the squared difference between the filtered output F and the noisy input C, minus the variance of the input. Its expected value would be $$E[(C-F)^2 - \text{Var}_C] = \text{Bias}_F^2 + \text{Var}_F - 2\text{Cov}_{C,F}. \quad (4)$$

If the input and the filtered results are uncorrelated, then the expected value of equation (4) could trivially be used to create an unbiased estimator of the true MSE. This is not the case for the collaborative first-order regression filter described herein, but the denoising application may leverage the two uncorrelated half buffers to sidestep this problem by computing the squared difference of the filtered first half buffer to the second input half buffer and vice-versa, and subtracting the variance of the input. If the two filtered half buffers are uncorrelated, this computation gives an unbiased estimator of the MSEs of each half buffer with $$\text{MSE}_{F_1} = (F_1 - C_2)_2 - \text{Var}_{C_2}$$

$$\text{MSE}_{F_2} = (F_2 - C_1)^2 - \text{Var}_{C_1}, \quad (5)$$

where $\text{Var}_{C_1} = \text{Var}_{C_2} = 2\text{Var}_C$, and $\text{Var}_C$ is the sample mean variance of all color samples. After the MSE estimation, the denoising application may average the two filtered half buffers to obtain $$F = \frac{F_1 + F_2}{2}.$$

In such a case, expected bias of F is not affected, but its variance is halved. As a result, the denoising application may estimate the MSE of the average half buffers as $$MSE_F = \frac{MSE_{F_1} + MSE_{F_2}}{2} - Var_F. \quad (6)$$

This estimator is unbiased under the assumption that the filtered half buffers are statistically independent. After obtaining the estimated MSE, the denoising application may further filter the estimated MSE and use the filtered estimated MSE to generate selection maps (e.g., the selection map 310) for each filtered bandwidth.

Figure 5:
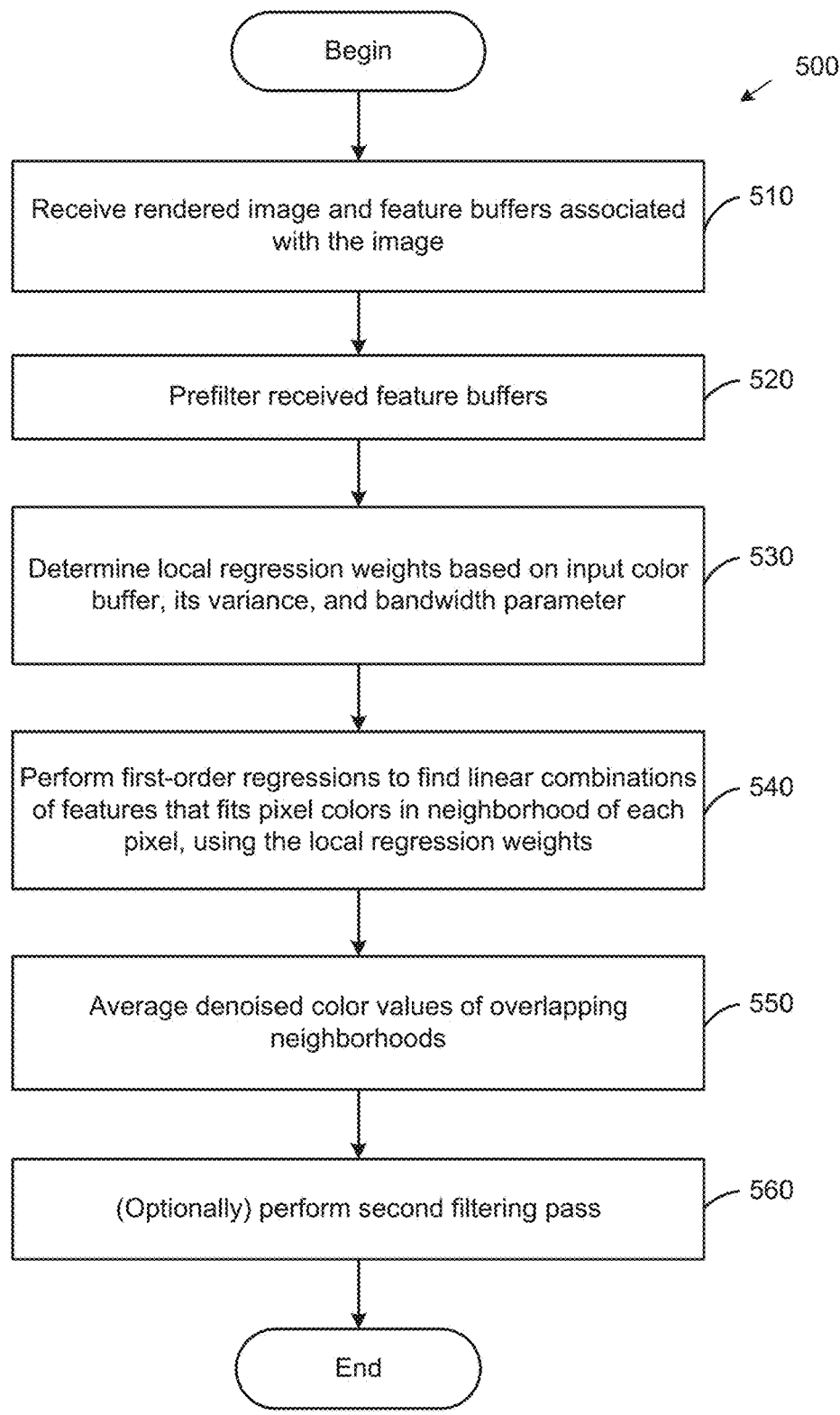
FIG. 5 illustrates a method for denoising rendered images, according to an embodiment.

FIG. 5 illustrates a method 500 for denoising rendered images, according to an embodiment. As shown, the method 500 begins at step 510, where the denoising application receives an image (color buffer) rendered via a MC rendering technique and auxiliary feature buffers associated with the image. As discussed, the auxiliary feature buffers may be produced by the renderer, and the features in the feature buffers may include surface positions, surface depths, surface normals, surface albedos, distances to a camera, visibility, a constant feature, and horizontal and vertical ramp features, among other things. In one embodiment, the features may be normalized to the same range (e.g., [−1, 1]) to improve numerical conditioning.

At step 520, the denoising application prefilters the received feature buffers. As discussed, the denoising application may perform such prefiltering with, e.g., an NLM filter. In one embodiment, the denoising application may employ the two-step filtering procedure discussed above with respect to FIG. 2.

At step 530, the denoising application determines local regression weights based on the input color buffer, its variance, and a bandwidth parameter. In one embodiment, the regression weights may be computed using a patch-wise metric in which distances are obtained based on color values in patches around the pixels being compared. For example, the patch-wise metric may involve taking two 9×9 (or any other sized) patches centered on the pixels being compared and computing the average difference between corresponding pixels in those patches. In a particular embodiment, weights of the non-local means (NLM) filter may be used as the local regression weights. As discussed, the NLM filter is a filter that uses weights computed from a patch-wise metric and, in particular, the distance metric in the NLM filter is the relative square distance between corresponding pixel pairs, averaged over two patches.

At step 540, the denoising application performs first-order regressions to find linear combinations of features that fits pixel colors in the neighborhood of each pixel, using the local regression weights determined at step 530. In one embodiment, the denoising application may split input color and feature buffers into two statistically independent sets of buffers and perform a cross-filtering in which the feature buffers of one set of buffers are used in fitting the color buffer of the other set of buffers, and vice versa. Alternatively, feature buffers of each set may be used to fit colors of the same set, or an average of features and colors of the two sets may be used in the fitting. Experience has shown that the main computational and memory cost of the filtering is the regression step 540, and a sparse collaborative reconstruction may be used (instead of a dense one) to reduce this cost.

At step 550, the denoising application averages the denoised color values of overlapping neighborhoods to determine the final output values, i.e., the denoising application performs collaborative filtering. In one embodiment, the denoising application may take a weighted average in which each of the neighborhoods being averaged is weighted by a respective regression kernel determined using the distance metric which computes distances based on color values in patches around pixels being compared.

At step 560, the denoising application (optionally) performs a second filtering pass on the final output values of step 550 to further remove residual noisy artifacts. Where the input color and feature buffers are split into statistically independent sets of buffers, the denoising application may perform the second filtering pass on an average of the outputs from cross-filtering of the two sets of buffers.

In one embodiment, the denoising application may also (optionally) perform space-time filtering. Residual low-frequency noise in the filtered output may cause disturbing flickering artifacts in animations. These artifacts may be mitigated by exploiting temporal coherence and, in particular, by expanding the regression window to the spatio-temporal domain by including noisy pixels and features from a number (e.g., two) of previous frames and a number (e.g., two) of next frames. In such a case, the frame index may be included as an additional auxiliary vector (similar to the auxiliary feature vectors), and the regression weights may be computed using a spatio-temporal NLM kernel.

Figure 6:
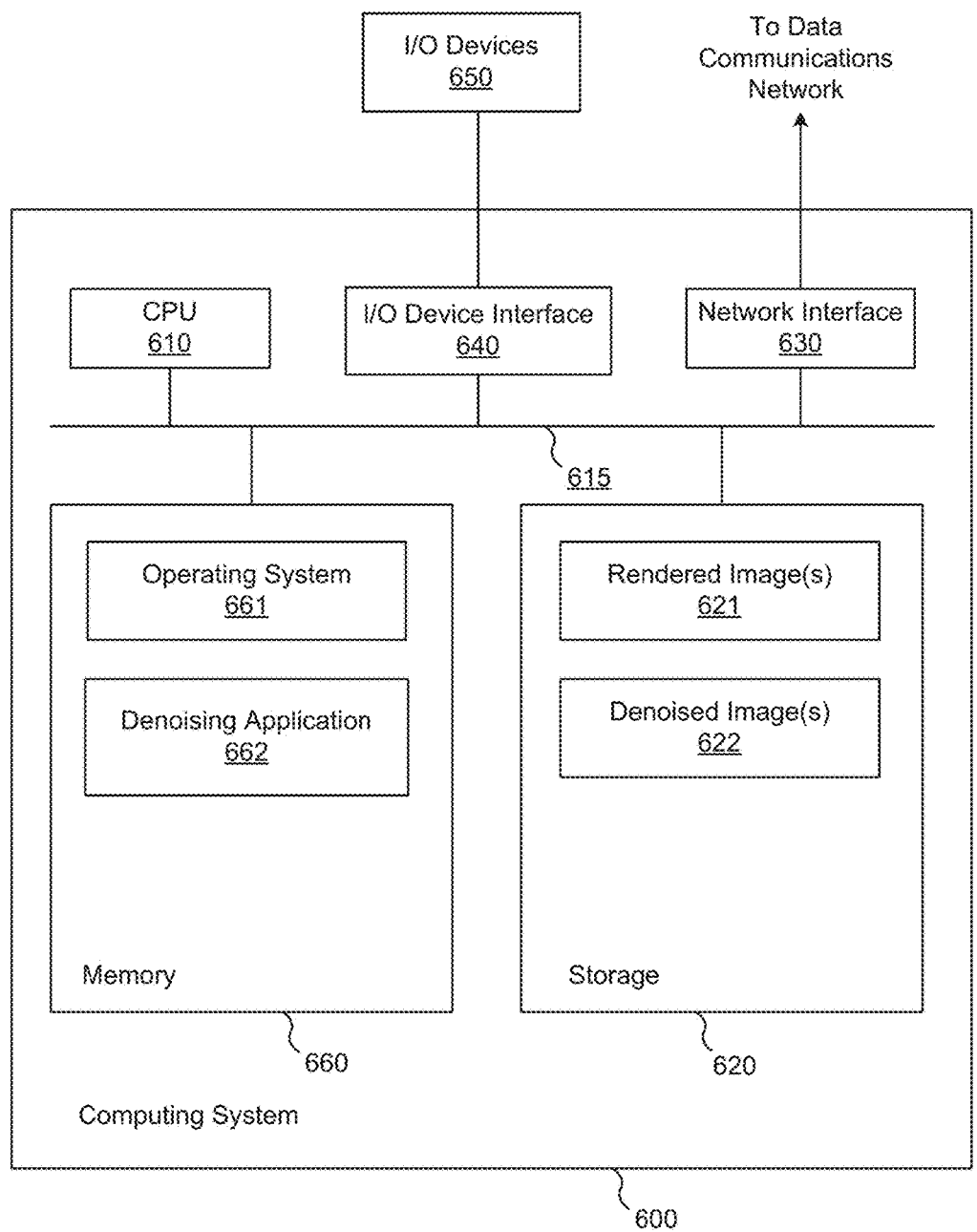
FIG. 6 illustrates a system in which an embodiment may be implemented.

FIG. 6 illustrates a system 600 in which an embodiment may be implemented. As shown, the system 600 includes, without limitation, a central processing unit (CPU) 610, a network interface 630, an interconnect 615, a memory 660 and storage 620. The system 600 may also include an I/O device interface 640 connecting I/O devices 650 (e.g., keyboard, display and mouse devices) to the system 600.

The CPU 610 retrieves and executes programming instructions stored in the memory 660. Similarly, the CPU 610 stores and retrieves application data residing in the memory 660. The interconnect 615 facilitates transmission, such as of programming instructions and application data, between the CPU 610, I/O device interface 640, storage 620, network interface 630, and memory 660. CPU 610 is included to be representative of a single CPU, multiple CPUs, a single CPU having multiple processing cores, and the like. And the memory 660 is generally included to be representative of a random access memory. The storage 620 may be a disk drive storage device. Although shown as a single unit, the storage 620 may be a combination of fixed and/or removable storage devices, such as fixed disc drives, floppy disc drives, tape drives, removable memory cards or optical storage, network attached storage (NAS), or a storage area-network (SAN). Further, system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 4 may be distributed across multiple computing systems connected by a data communications network.

As shown, the memory 660 includes an operating system 661 and a denoising application 662. For example, the operating system 661 may be Microsoft Windows®. The denoising application 662 is configured to perform a collaborative first-order regression to denoise rendered image(s) 621 and produce denoised images(s) 622. Although shown as an application executed by CPU 610, the denoising application 662 may be implemented differently in other embodiments, e.g., as shaders or in fixed function hardware in a graphics processing unit (GPU), or as a combination of hardware and software. In one embodiment, the denoising application 662 may be configured to receive a rendered image and feature buffers associated with the image; prefilter the received feature buffers; determine local regression weights based on the input color buffer, its variance, and a bandwidth parameter; perform first-order regressions to find linear combinations of features that fits pixel colors in the neighborhood of each pixel, using the local regression weights; average the denoised color values of overlapping neighborhoods; and (optionally) perform a similar second filtering pass, as discussed above with respect to FIG. 5.

Although discussed herein primarily with respect to images rendered via MC rendering, techniques disclosed herein may also be applied to filter other types of rendered images, such as images rendered via quasi MC rendering techniques. Although discussed herein primarily with respect to first-order regressions, it should be understood that techniques disclosed herein may employ regressions of other orders as well. For example, NLM weights may be applied to zero- and first-order regressions, but NLM weights may also be applied to higher-order regressions.

Advantageously, techniques disclosed herein permit noisy rendered images to be denoised with state-of-the art performance on a wide variety of scenes. In particular, techniques disclosed herein provide a good match to the characteristics of an ideal production denoiser, which include effectiveness (producing significant noise reduction without introducing disturbing artifacts or overblurring), predictability (consistently good performance without requiring per-shot parameter tuning or manual intervention and degrade gracefully when assumptions are not met), temporal stability (produce flicker-free results across frames rendering with varying samples, camera positions, object positions, and other scene changes), ease of adoption (easy to integrate into the production pipeline without requiring renderer changes which are difficult or expensive to implement), speed (the filter should run significantly faster than the time to render equivalent additional samples), and reduced memory (the filter should use significantly less memory than the render to minimize memory cost of adaptive sampling). While patch-wise metrics such as that used to compute weights in the NLM filter are a poor choice in denoising images using traditional zero-order regression, embodiments described herein use the patch-wise metric to determine weights in first-order (and other order) regression, which as discussed has produced surprisingly high quality results. In addition, embodiments presented herein use feature prefiltering, collaborative filtering, and a two-step selection-based bandwidth estimation process to further improve the denoised image quality.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the present invention, other and further aspects of the invention may be devised without departing from the basic scope thereof, and the scope thereof is determined by the claims that follow.

What is claimed is:

1. A computer-implemented method for denoising a rendered image, comprising:
   receiving the rendered image and a set of features associated with the rendered image;
   for each pixel of a plurality of pixels in the rendered image, performing a regression in a predefined neighborhood of the pixel to find a combination of pixel features that fits pixel colors in the predefined neighborhood, wherein, in the regression, a respective local regression weight associated with each pixel in the predefined neighborhood is determined based, at least in part, on a distance metric which computes distances based, at least in part, on color values in patches around pixels being compared; and
   determining a respective output color value for each pixel of a plurality of pixels in a denoised image corresponding to a respective one of the plurality of pixels in the rendered image based, at least in part, on the fittings produced by a plurality of the regressions.

2. The method of claim 1, wherein the regression performed for each of the plurality of pixels in the rendered image is a first-order regression and the combination of pixel features that fits pixel colors in the predefined neighborhood is a linear combination.

3. The method of claim 1, wherein:
   the determining of the respective output color value for each pixel of the plurality of pixels in the denoised image includes averaging denoised color values of overlapping neighborhoods as produced by the plurality of regressions; and
   in the averaging, each of the overlapping neighborhoods is weighted by a respective regression kernel determined using the distance metric which computes distances based, at least in part, on color values in patches around pixels being compared.

4. The method of claim 1, further comprising, filtering the features to remove noise therein prior to performing the regression for each of the plurality of pixels in the rendered image.

5. The method of claim 3, wherein:
   colors of the received rendered image and the received features are separated into two statistically independent sets of buffers, each of the sets of buffers including a color buffer and a feature buffer, that are processed separately;
   either features in each one of the sets of buffers are used in the regressions to fit colors of another one of the sets of buffers, or features in each one of the sets of buffers are used in the regressions to fit colors of the same set of buffers, or features and colors averaged on the two sets of buffers are used in the regressions to fit colors of both buffers, to determine respective intermediate output color values for each of the plurality of pixels in the rendered image; and
   the intermediate output color values are combined to determine the respective output color value of each of the plurality of pixels in the rendered image.

6. The method of claim 5, wherein a bandwidth controlling a number of pixels considered in the regression is determined based, at least in part, on squared differences between filtered color buffers of each one of the sets of buffers and the received color buffers of the other one of the sets of buffers.

7. The method of claim 5, wherein:
the regression for each of the plurality of pixels in the rendered image is performed multiple times with different bandwidth parameters; and
the determined output color values are obtained as a weighted average of color buffers obtained from the multiple regressions with different bandwidth parameters.

8. The method of claim 1, further comprising, repeating the step of performing the regression for each of a plurality of pixels in the denoised image having the output color values and the step of determining the respective output color values.

9. The method of claim 1, wherein the set of features includes at least one of surface positions, surface depths, surface normals, surface albedos, distances to a camera, visibility, a constant feature, and horizontal and vertical ramp features.

10. A non-transitory computer-readable storage medium storing instructions, which when executed by a computer system, perform operations for denoising a rendered image, the operations comprising:
receiving the rendered image and a set of features associated with the rendered image;
for each pixel of a plurality of pixels in the rendered image, performing a regression in a predefined neighborhood of the pixel to find a combination of pixel features that fits pixel colors in the predefined neighborhood, wherein, in the regression, a respective local regression weight associated with each pixel in the predefined neighborhood is determined based, at least in part, on a distance metric which computes distances based, at least in part, on color values in patches around pixels being compared; and
determining a respective output color value for each pixel of a plurality of pixels in a denoised image corresponding to a respective one of the plurality of pixels in the rendered image based, at least in part, on the fittings produced by a plurality of the regressions.

11. The computer-readable storage medium of claim 10, wherein the regression performed for each of the plurality of pixels in the rendered image is a first-order regression and the combination of pixel features that fits pixel colors in the predefined neighborhood is a linear combination.

12. The computer-readable storage medium of claim 10, wherein:
the determining of the respective output color value for each pixel of the plurality of pixels in the denoised image includes averaging denoised color values of overlapping neighborhoods as produced by the plurality of regressions; and
in the averaging, each of the overlapping neighborhoods is weighted by a respective regression kernel determined using the distance metric which computes distances based, at least in part, on color values in patches around pixels being compared.

13. The computer-readable storage medium of claim 10, the operations further comprising, filtering the features to remove noise therein prior to performing the regression for each of the plurality of pixels in the rendered image.

14. The computer-readable storage medium of claim 13, wherein:
colors of the received rendered image and the received features are separated into two statistically independent sets of buffers, each of the sets of buffers including a color buffer and a feature buffer, that are processed separately;
either features in each one of the sets of buffers are used in the regressions to fit colors of another one of the sets of buffers, or features in each one of the sets of buffers are used in the regressions to fit colors of the same set of buffers, or features and colors averaged on the two sets of buffers are used in the regressions to fit colors of both buffers, to determine respective intermediate output color values for each of the plurality of pixels in the rendered image; and
the intermediate output color values are combined to determine the respective output color value of each of the plurality of pixels in the rendered image.

15. The computer-readable storage medium of claim 13, wherein a bandwidth controlling a number of pixels considered in the regression is determined based, at least in part, on squared differences between filtered color buffers of each one of the sets of buffers and the received color buffers of the other one of the sets of buffers.

16. The computer-readable storage medium of claim 13, wherein:
the regression for each of the plurality of pixels in the rendered image is performed multiple times with different bandwidth parameters; and
the determined output color values are obtained as a weighted average of color buffers obtained from the multiple regressions with different bandwidth parameters.

17. The computer-readable storage medium of claim 10, the operations further comprising, repeating the step of performing the regression for each of a plurality of pixels in the denoised image having the output color values and the step of determining the respective output color values.

18. The computer-readable storage medium of claim 10, wherein the set of features includes at least one of surface positions, surface depths, surface normals, surface albedos, distances to a camera, visibility, a constant feature, and horizontal and vertical ramp features.

19. A system, comprising:
a processor; and
a memory, wherein the memory includes an application program configured to perform operations for denoising a rendered image, the operations comprising:
receiving the rendered image and a set of features associated with the rendered image,
for each pixel of a plurality of pixels in the rendered image, performing a regression in a predefined neighborhood of the pixel to find a combination of pixel features that fits pixel colors in the predefined neighborhood, wherein, in the regression, a respective local regression weight associated with each pixel in the predefined neighborhood is determined based, at least in part, on a distance metric which computes distances based, at least in part, on color values in patches around pixels being compared, and
determining a respective output color value for each pixel of a plurality of pixels in a denoised image corresponding to a respective one of the plurality of pixels in the rendered image based, at least in part, on the fittings produced by a plurality of the regressions.

20. The system of claim 19, wherein:
the regression performed for each of the plurality of pixels in the rendered image is a first-order regression and the combination of pixel features that fits pixel colors in the predefined neighborhood is a linear combination;

the determining of the respective output color value for each pixel of the plurality of pixels in the denoised image includes averaging denoised color values of overlapping neighborhoods as produced by the plurality of regressions; and in the averaging, each of the overlapping neighborhoods is weighted by a respective regression kernel determined using the distance metric which computes distances based, at least in part, on color values in patches around pixels being compared.

\* \* \* \* \*

UNITED STATES PATENT AND TRADEMARK OFFICE
CERTIFICATE OF CORRECTION

PATENT NO. : 10,096,088 B2
APPLICATION NO. : 15/279234
DATED : October 9, 2018
INVENTOR(S) : Benedikt Martin Bitterli et al.

It is certified that error appears in the above-identified patent and that said Letters Patent is hereby corrected as shown below:

In the Specification

In Column 6, Line 60, delete "$\text{Error}(\hat{c}_p) = \Sigma_{q \in N_p}(c_q - \tilde{m}_x(p,q)q)^2 \tilde{w}_y(p,q)$" and insert --$\text{Error}(\hat{c}_p) = \Sigma_{q \in N_p}(c_q - \tilde{m}_x(p,q))^2 \tilde{w}_y(p,q)$--, therefor.

In Column 10, Line 52, delete "$\text{MSE}_{F_1} = (F_1 - C_2)_2 - \text{Var}_{C_2}$" and insert --$\text{MSE}_{F_1} = (F_1 - C_2)^2 - \text{Var}_{C_2}$--, therefor.

In the Claims

In Column 14, Line 61, in Claim 5, after "each" insert -- pixel --.

In Column 14, Line 63, in Claim 5, after "values" insert -- for each pixel of the plurality of pixels in the rendered image --.

In Column 14, Line 64, in Claim 5, delete "the" and insert -- a --, therefor.

In Column 14, Line 64, in Claim 5, after "respective" insert -- one of the --.

In Column 14, Line 64, in Claim 5, delete "value" and insert -- values --, therefor.

In Column 14, Line 64, in Claim 5, delete "each of" and insert -- a corresponding one of --, therefor.

In Column 14, Line 65, in Claim 5, delete "rendered" and insert -- denoised --, therefor.

In Column 15, Line 3, in Claim 6, after "and" delete "the".

In Column 16, Line 14, in Claim 14, after "each" insert -- pixel --.
In Column 16, Line 16, in Claim 14, after "values" insert -- for each pixel of the plurality of pixels in the rendered image --.

Signed and Sealed this
Thirtieth Day of April, 2019

Andrei Iancu
*Director of the United States Patent and Trademark Office*

In Column 16, Line 17, in Claim 14, delete "the" and insert -- a --, therefor.

In Column 16, Line 17, in Claim 14, after "respective" insert -- one of the --.

In Column 16, Line 17, in Claim 14, delete "value" and insert -- values --, therefor.

In Column 16, Line 17, in Claim 14, delete "each of" and insert -- a corresponding one of --, therefor.

In Column 16, Line 18, in Claim 14, delete "rendered" and insert -- denoised --, therefor.

In Column 16, Line 23, in Claim 15, after "and" delete "the".